(12) United States Patent
Park et al.

(10) Patent No.: US 11,556,209 B2
(45) Date of Patent: Jan. 17, 2023

(54) TOUCH SENSING DEVICE FOR COMPENSATING FOR PHASE ERROR OF ACTIVE PEN AND METHOD THEREOF

(71) Applicant: SILICON WORKS CO., LTD., Daejeon (KR)

(72) Inventors: Sun Young Park, Daejeon (KR); Kyung Hwan Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/375,080

(22) Filed: Jul. 14, 2021

(65) Prior Publication Data

US 2022/0019331 A1 Jan. 20, 2022

(30) Foreign Application Priority Data

Jul. 15, 2020 (KR) .................. 10-2020-0087497

(51) Int. Cl.
*G06F 3/041* (2006.01)
*G06F 3/0354* (2013.01)

(52) U.S. Cl.
CPC ...... *G06F 3/04184* (2019.05); *G06F 3/03545* (2013.01); *G06F 3/0412* (2013.01); *G06F 3/04162* (2019.05)

(58) Field of Classification Search
CPC ............. G06F 3/04184; G06F 3/03545; G06F 3/0412; G06F 3/04162; G06F 3/041; G06F 3/0441; G06F 3/0383; G06F 3/0418; G06F 3/0442; G06F 3/044
See application file for complete search history.

(56) References Cited

U.S. PATENT DOCUMENTS 9,772,696 B2    9/2017  Dinu et al.
2019/0004664 A1*  1/2019  Zyskind .............. G06F 3/03545

* cited by examiner

*Primary Examiner* — Temesghen Ghebretinsae
*Assistant Examiner* — Ivelisse Martinez Quiles
(74) *Attorney, Agent, or Firm* — Harness, Dickey & Pierce, P.L.C.

(57) ABSTRACT

A touch sensing device that compensates for a phase error of a downlink signal transmitted/received between a display device and an active pen. The touch sensing device includes a differential amplifier configured to amplify a difference between a first accumulated capacitance value for a first touch group and a second accumulated capacitance value for a second touch group, based on a first downlink signal generated during a pre-driving section, an ADC configured to convert an output signal of the differential amplifier into digital data, and a phase error compensator configured to detect an edge of the first downlink signal based on a difference value between current and previous values of the digital data and compensate for a phase error of the first downlink signal using the edge of the first downlink signal and an edge of an internal timing signal.

15 Claims, 9 Drawing Sheets

TOUCH SENSING DEVICE FOR COMPENSATING FOR PHASE ERROR OF ACTIVE PEN AND METHOD THEREOF

CROSS-REFERENCE TO RELATED APPLICATIONS

This application claims the benefit of the Korean Patent Application No. 10-2020-0087497 filed on Jul. 15, 2020, which is hereby incorporated by reference as if fully set forth herein.

FIELD

The present specification relates to a touch sensing device, and more particularly, to a touch sensing device capable of sensing a touch made by an active pen.

BACKGROUND

Recently, stylus pens as well as fingers are being used as an input device in various display devices. The stylus pens have an advantage of enabling a more precise input as compared to a finger. The stylus pens are classified into a passive type and an active type.

A passive type stylus pen (hereinafter, referred to as a "passive pen") has a disadvantage in that it is difficult to detect a touch position because capacitance variation occurring at a contact point between the passive pen and a display panel is small, whereas an active type stylus pen (hereinafter referred to as an "active pen") generates a pen driving signal autonomously and outputs the generated pen driving signal to a contact point between the active pen and a display panel, and thus, there is an advantage in that a touch position of the active pen is easy to detect as compared to the passive pen, thereby the use of the active pen is increasing.

However, when an active pen is used, the active pen and a display device operate as independent devices that are not connected to each other, and thus, when timings used by both devices are not synchronized, there is a problem that signal transmission and reception may not be smoothly performed. For example, when a phase difference exists between a transmission timing at which the active pen transmits a pen signal and a reception timing at which the display device receives the corresponding pen signal, signal reception sensitivity is lowered in the display device, and thus desired information may not be accurately transmitted.

In order to solve this problem, a method in which the display device transmits a ping signal to the active pen and the active pen detects the ping signal to perform synchronization has been proposed for the synchronization between the display device and the active pen. However, when the synchronization is performed between the active pen and the display device through the transmission of the ping signal from the display device to the active pen, the display device has to transmit the ping signal to the active pen for each long horizontal blanking (LHB) representing a touch sensing period during which touch sensing for a finger or an active pen is performed in one frame, and thus there is a problem in that power consumption is large.

In addition, since synchronization itself is impossible when the active pen cannot interpret the ping signal, the display device has to depend on the synchronization capability of the active pen, and thus there is also a problem in that the degree of freedom of selection for the active pen may be limited.

SUMMARY

Therefore, the present disclosure is designed to solve the problems and is directed to providing a touch sensing device for compensating for a phase error of an active pen and a method of compensating for the phase error of the active pen, capable of compensating for a phase error of a downlink signal, which is transmitted and received between a display device and the active pen, even without a separate synchronization signal transmission.

The present disclosure is also directed to providing a touch sensing device for compensating for a phase error of an active pen and a method of compensating for the phase error of the active pen, capable of compensating for a phase error of a downlink signal even without a separate comparator for the synchronization of an internal timing signal.

A touch sensing device, which compensates for a phase error of an active pen, according to one aspect of the present disclosure includes a differential amplifier configured to amplify a difference between a first accumulated capacitance value, which is obtained from a first touch group, and a second accumulated capacitance value, which is obtained from a second touch group, on the basis of a first downlink signal generated by the active pen during a pre-driving section, an analog-to-digital converter (ADC) configured to convert an output signal of the differential amplifier into digital data, and a phase error compensator configured to detect an edge of the first downlink signal on the basis of a difference value between current and previous values of the digital data output from the ADC and compensate for a phase error of the first downlink signal by comparing the edge of the first downlink signal with an edge of an internal timing signal.

A method of compensating for a phase error of an active pen according to another aspect of the present disclosure includes amplifying a difference between a first accumulated capacitance value, which is obtained from a first touch group, and a second accumulated capacitance value, which is obtained from a second touch group, on the basis of a first downlink signal received from the active pen during a pre-driving section, converting the amplified difference into digital data according to a predetermined sampling period, detecting an edge of the first downlink signal on the basis of a difference value between current and previous values of the digital data, detecting a phase error of the first downlink signal by comparing the edge of the first downlink signal with an edge of an internal timing signal, and compensating for the phase error by adjusting the internal timing signal according to the phase error.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
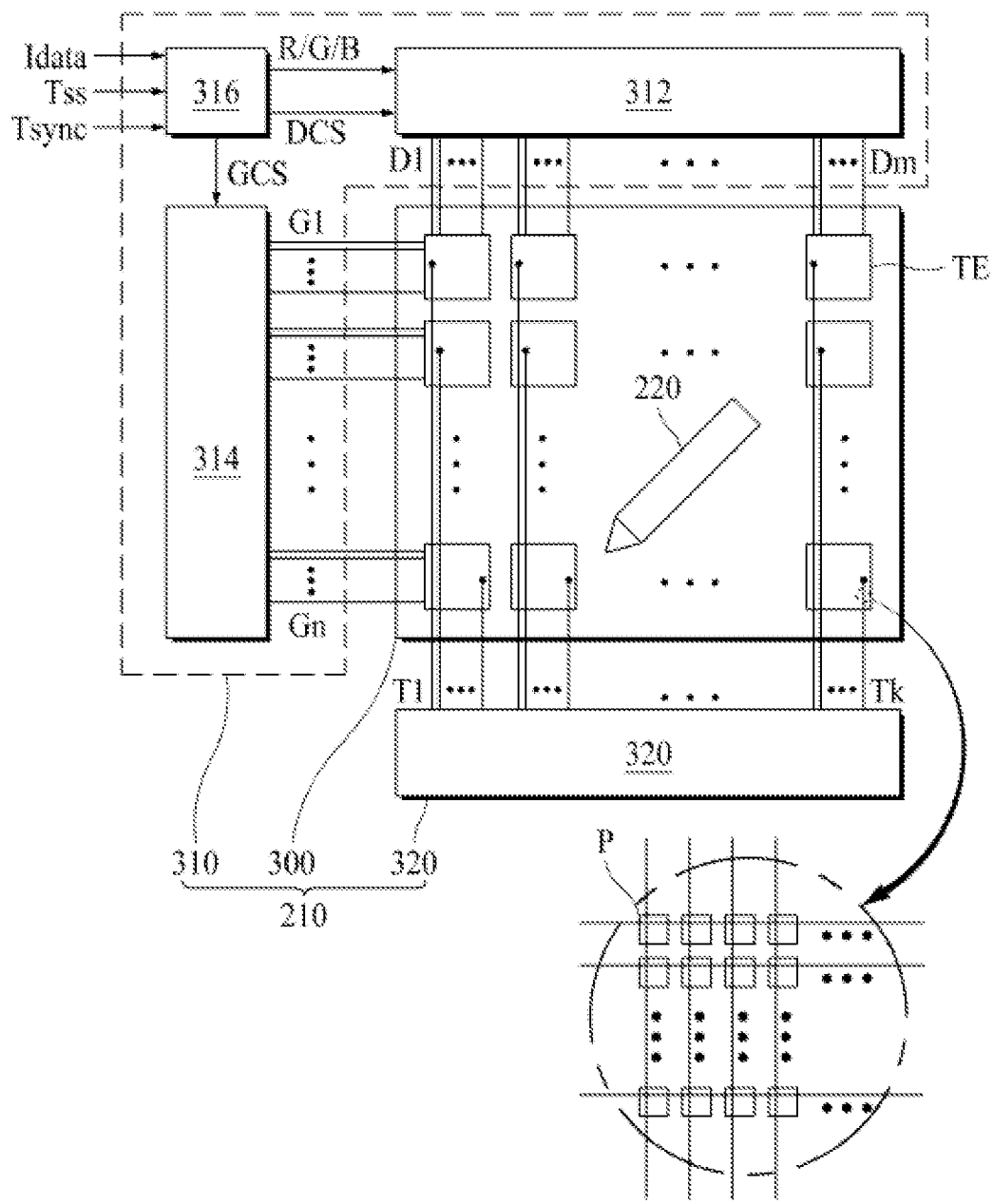
FIG. 1 is a diagram illustrating a configuration of a display system according to one embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

In a case where 'comprise', 'have', and 'include' described in the present specification are used, another part may be added unless 'only' is used. The terms of a singular form may include plural forms unless referred to the contrary.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Hereinafter, embodiments of this specification will be described in detail with reference to the accompanying drawings.

FIG. 1 is a schematic diagram illustrating a configuration of a display system according to one embodiment of the present disclosure. As shown in FIG. 1, a display system 200 according to one embodiment of the present disclosure may include a display device 210 and an active pen 220.

The display device 210 may perform a display function and a touch sensing function and may be implemented as a flat panel display such as a liquid crystal display (LCD) or an organic light-emitting diode (OLED) display.

In one embodiment, the display device 210 according to the present disclosure may include a capacitive touch screen implemented as one body therein to sense a touch performed by a conductive object such as a finger or the active pen 220 coming into contact therewith. The touch screen may be configured to be independent of a display panel for implementing a display and may be embedded in a pixel array of the display panel.

A detailed description of a configuration of the display device 210 will be described below with reference to FIGS. 2 to 5.

The active pen 220 generates a downlink signal including pen data in synchronization with an uplink signal received from the display device 210 and outputs the downlink signal to a contact point between the active pen 220 and the touch screen. In one embodiment, the active pen 220 may modulate the downlink signal using a binary phase shift keying (BPSK) scheme or a differential binary phase shift keying (DPSK) scheme and may output the modulated downlink signal to the touch screen.

In one embodiment, the pen data may include pen pressure information representing pressure when the active pen 220 comes into contact with the touch screen, button state information representing the activation or non-activation of one or more functional buttons that are included in the active pen 220 and perform a specific function, pen identification information for differentiating the active pen 220 from other active pens, pen slope information representing a slope of the pen, removing information representing whether to remove content input by the pen, and the like.

As shown in FIG. 1, the display device 210 according to one embodiment of the present disclosure includes a display panel 300, a panel driving device 310, and a touch sensing device 320.

The display panel 300 displays an image with a predetermined gray level or receives a touch made by a finger or the active pen 220. In one embodiment, the display panel 300 may be a display panel having a structure of an in-cell touch type using a capacitance type. In accordance with such an embodiment, the display panel 300 may be an in-cell touch type display panel using a self-capacitance type or an in-cell touch type display panel using a mutual capacitance type. Hereinafter, for convenience of description, a description will be made assuming that the display panel 300 is an in-cell touch type display panel using a self-capacitance type.

The display panel 300 operates in a display mode and a touch sensing mode. The display panel 300 displays an image during the display mode and serves as a touch panel for touch sensing during the touch sensing mode.

Figure 2:
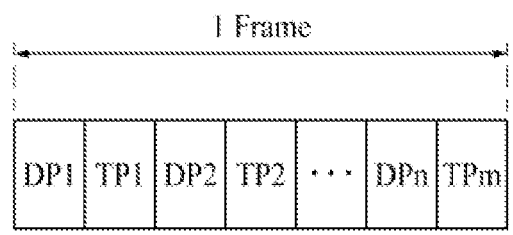
FIG. 2 is a diagram illustrating one frame period including a plurality of display periods and a plurality of touch sensing periods.

In one embodiment, as shown in FIG. 2, the display mode may be performed in each of a plurality of display periods DP1 to DPn set in one frame, and the touch sensing mode may be performed in each of a plurality of touch sensing periods TP1 to TPm set between the plurality of display periods DP1 to DPn in one frame. In this case, in order to implement a high resolution, the number of display periods DP1 to DPn may be set to be more than the number of touch sensing periods TP1 to TPm in one frame, or a length of the display periods DP1 to DPn may be set to be greater than a length of the touch sensing periods TP1 to TPm.

Figure 3:
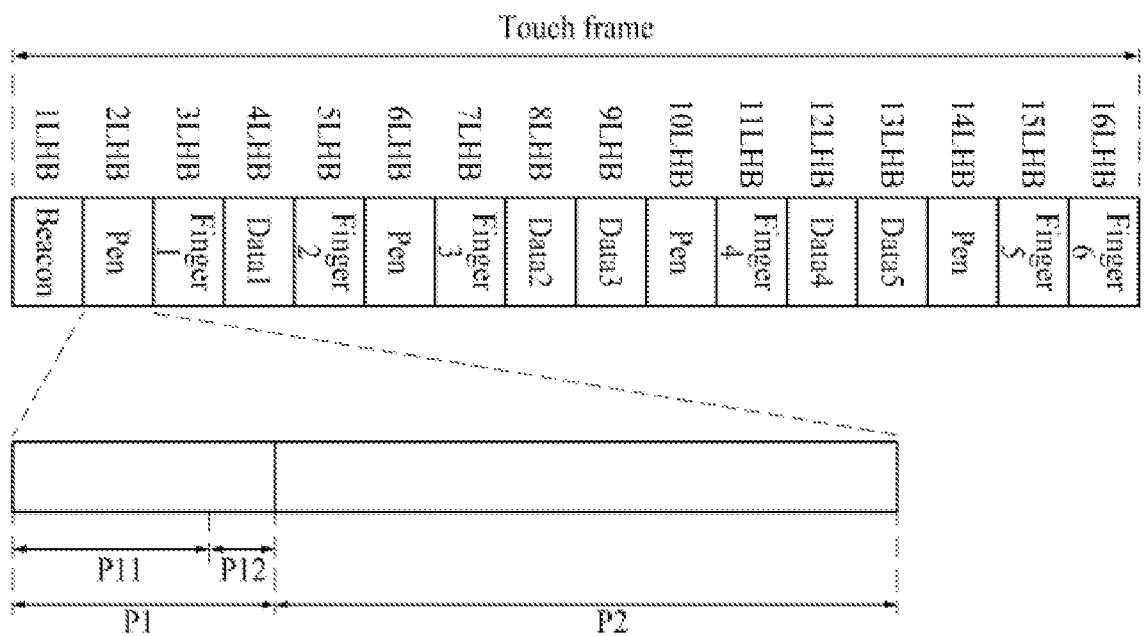
FIG. 3 is a diagram illustrating a touch frame of a touch sensing device according to one embodiment of the present disclosure.

As an example, when one frame is configured as sixteen touch sensing periods TP1 to TP16, as shown in FIG. 3, the touch sensing periods TP1 to TP16 may include a first touch sensing period 1LHB during which the uplink signal (e.g., a beacon signal) is transmitted, a plurality of second touch sensing periods 2LHB, 4LHB, 6LHB, 8LHB, 9LHB, 10LHB, 12LHB, 13LHB, and 14LHB for sensing a touch made by the active pen 220, and a plurality of third touch sensing periods 3LHB, 8LHB, 7LHB, 11LHB, 15LHB, and 16LHB for sensing a finger touch. At this point, pen data of the active pen is sensed during the second touch sensing periods 4LHB, 8LHB, 9LHB, 12LHB, and 13LHB, and pen touch coordinates of the active pen are sensed during the second touch sensing periods 2LHB, 6LHB, 10LHB, and 14LHB. Here, long horizontal blanking (LHB) represents a period during which touch sensing is performed on a finger or an active pen in one frame.

In accordance with such an example, during the second touch sensing periods 2LHB, 4LHB, 6LHB, 8LHB, 9LHB, 10LHB, 12LHB, 13LHB, and 14LHB, a touch driving signal or the uplink signal is not supplied to the display panel 300, and thus, the display panel 300 may be maintained in a non-driving state.

In FIG. 3, it is illustrated that one frame includes sixteen touch sensing periods, but this is merely an example, and one frame may include more than sixteen touch sensing periods, or less than sixteen touch sensing periods.

Hereinafter, for convenience of description, a reference numeral of the first touch sensing period is denoted as "TT1," a reference numeral of the second touch sensing period is denoted as "TT2," and a reference numeral of the third touch sensing period is denoted as "TT3."

Meanwhile, the display panel 300 includes a plurality of data lines D1 to Dm, a plurality of gate lines G1 to Gn, a plurality of pixels P, a plurality of touch electrodes TE, and a plurality of touch lines T1 to Tk.

In the display mode, each of the plurality of data lines D1 to Dm receives a data signal. In the display mode, each of the plurality of gate lines G1 to Gn receives a scan pulse. The plurality of data lines D1 to Dm and the plurality of gate lines G1 to Gn may be provided on a substrate to respectively intersect each other, thereby defining a plurality of pixel areas. Each of the plurality of pixels P may include a thin-film transistor (not shown) connected to a gate line and a data line adjacent thereto, a pixel electrode (not shown) connected to the thin-film transistor, and a storage capacitor (not shown) connected to the pixel electrode.

Each of the plurality of touch electrodes TE serves as a touch sensor (or a touch node) for sensing a touch made by a finger or the active pen 220 or serves as a common electrode configured to generate an electric field together with the pixel electrode to drive liquid crystal. That is, each of the plurality of touch electrodes TE may be used as the touch sensor in the touch sensing mode and may be used as the common electrode in the display mode. Each of the plurality of touch electrodes TE is used as the common electrode and, thus, may be made of a transparent conductive material.

In the touch sensing mode, each of the plurality of touch electrodes TE may be used as a self-capacitance type touch sensor and, thus, may have a size that is greater than a minimum contact size between a touch object and the display panel 300. Accordingly, each of the plurality of touch electrodes TE may have a size corresponding to one or more pixels P. In one embodiment, the plurality of touch electrodes TE may be disposed at regular intervals along a plurality of horizontal lines and a plurality of vertical lines.

Each of the plurality of touch lines T1 to Tk is individually connected to a corresponding touch electrode of the plurality of touch electrodes TE. During the display sections DP1 to DPn of one frame period illustrated in FIG. 2, each of the plurality of touch lines T1 to Tk may provide a common voltage Vcom to the corresponding touch electrode TE.

Further, as shown in FIG. 3, during a first touch sensing period TT1 of the one frame period, each of the plurality of touch lines T1 to Tk may provide the uplink signal through the corresponding touch electrode TE. In addition, during a plurality of second touch sensing periods TT2 of the one frame period, each of the plurality of touch lines T1 to Tk may provide the touch sensing device 320 with a capacitance that is generated in the corresponding touch electrode TE by the downlink signal transmitted from the active pen 220. In addition, during a plurality of third touch sensing periods TT3 of the one frame period, each of the plurality of touch lines T1 to Tk may provide the corresponding touch electrode TE with the touch driving signal and may provide the touch sensing device 320 with a capacitance that is generated in the corresponding touch electrode TE by a finger touch.

Referring again to FIG. 1, during the display sections DP1 to DPn, the panel driving device 310 may allow data signals to be supplied to the plurality of pixels P included in the display panel 300, thereby allowing the display panel 300 to display an image. In one embodiment, the panel driving device 310 may include a data driver 312, a gate driver 314, and a timing controller 316.

During the display period, the data driver 312 may convert pixel data R/G/B into analog data signals on the basis of a data control signal DCS and may supply the analog data signals to the pixels P through the plurality of data lines D1 to Dm.

In one embodiment, during the plurality of third touch sensing periods TT3 during which a finger touch is sensed, the data driver 312 may supply a data load free signal to each of the plurality of data lines D1 to Dm overlapping the touch electrode TE to which the touch driving signal is applied. The data load free signal may be a signal having the same phase as the touch driving signal that is applied to the touch electrode TE during the plurality of third touch sensing periods TT3. As described above, the data driver 312 may apply the data load free signal, which has the same phase as the touch driving signal, to the plurality of data lines D1 to Dm overlapping the touch electrode TE to which the touch driving signal is applied to decrease loads of the touch electrodes TE caused by parasitic capacitances between the touch electrode TE and the data lines D1 to Dm, thereby improving touch sensitivity.

The gate driver 314 may generate the scan pulses in a predetermined order on the basis of a gate control signal GCS and may supply the scan pulses to the gate lines G1 to Gn corresponding to the predetermined order. The scan pulses supplied to the gate lines G1 to Gn are respectively synchronized with the data signals supplied to the data lines D1 to Dm. In one embodiment, the gate driver 314 may be embedded (or integrated) into non-display area of the display panel 300 in a process of manufacturing the thin-film transistor of each of the pixels P and may be connected to each of the plurality of gate lines G1 to Gn.

Meanwhile, similar to the data driver 312, during the third touch sensing period TT3 during which a finger touch is sensed, the gate driver 314 may supply a gate load free signal to each of the plurality of gate lines G1 to Gn overlapping the touch electrode TE to which the touch driving signal is applied. The gate load free signal may be a signal having the same phase as the touch driving signal applied to the touch electrode TE during the third touch sensing period TT3. As described above, the gate driver 314 may apply the gate load free signal, which has the same phase as the touch driving signal, to the plurality of gate lines G1 to Gn overlapping the touch electrode TE to which the touch driving signal is applied to decrease loads of touch electrodes TE caused by parasitic capacitances between the touch electrode TE and the gate lines G1 to Gn, thereby improving touch sensitivity.

The timing controller 316 receives a timing synchronization signal TSS, such as a data enable signal, a reference clock signal, a vertical synchronization signal Vsync, and a horizontal synchronization signal, supplied from a host system (not shown) and may control driving of the data driver 312, the gate driver 314, and the touch sensing device 320 on the basis of the timing synchronization signal TSS. In particular, the timing controller 316 according to the present disclosure may directly generate a touch synchronization signal Tsync or may receive the touch synchronization signal Tsync from the host system and may time-divisionally drive one frame in the plurality of display periods DP1 to DPn and the plurality of touch sensing periods TP1 to TPm on the basis of the touch synchronization signal.

In addition, the timing controller 316 may receive input data Idata from the host system and align the input data Idata into pixel data R/G/B suitable for driving of the display panel 300 to provide the aligned data to the data driver 312 in each of the plurality of display periods DP1 to DPn.

The timing controller 316 generates and outputs the data control signal DCS and the gate control signal GCS on the basis of the timing synchronization signal TSS and the touch synchronization signal Tsync. The data control signal DCS may include a source start signal, a source shift signal, a source enable signal, a polarity control signal, and the like. In addition, the gate control signal GCS may include at least one gate start signal, a plurality of gate shift clocks, and the like.

The touch sensing device 320 senses a pen touch made by the active pen 220 and a finger touch through the touch electrodes TE during the first to third touch sensing periods TT1 to TT3 in response to the touch sensing periods TP1 to TPm of the touch synchronization signal Tsync input from the timing controller 316 or the host system.

In particular, during the second touch sensing period TT2, the touch sensing device 320 according to the present disclosure may sense the downlink signal transmitted from the active pen 220 to obtain at least one of pen data and pen touch coordinates. Here, the sensing of the downlink signal may be performed by sensing a change in capacitance generated in the touch electrode TE due to the active pen 220.

Meanwhile, during the third touch sensing periods TT3, the touch sensing device 320 may calculate finger touch coordinates on the basis of the amount of change in capacitance generated in the touch electrode TE due to the finger touch.

Hereinafter, a configuration of the touch sensing device according to the present disclosure will be described in detail with reference to FIGS. 4 to 11.

Figure 4:
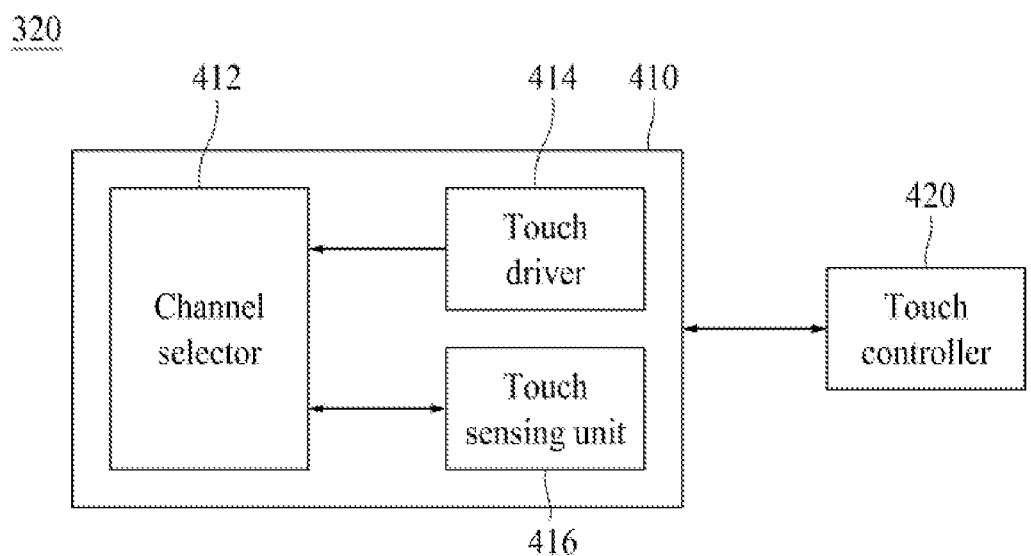
FIG. 4 is a schematic block diagram illustrating a configuration of the touch sensing device shown in FIG. 1.

FIG. 4 is a schematic block diagram illustrating a configuration of a touch sensing device according to one embodiment of the present disclosure. As shown in FIG. 4, the touch sensing device 320 according to one embodiment of the present disclosure includes a touch integrated circuit (IC) 410 and a touch controller 420, and the touch IC 410 includes a channel selector 412, a touch driver 414, and a touch sensing unit 416. In FIG. 4, it is described that the touch sensing device 320 includes one touch IC 410, but the touch sensing device 320 may also include a plurality of touch ICs 410.

The channel selector 412 is connected to each of the plurality of touch electrodes TE through the plurality of touch lines T1 to Tk shown in FIG. 1. The channel selector 412 supplies the uplink signal supplied from the touch driver 414 to the touch electrode TE during the first touch sensing period TT1 and supplies the touch driving signal supplied from the touch driver 414 to the touch electrode TE during the third touch sensing period TT3.

Further, the channel selector 412 connects the touch lines T1 to Tk to the touch sensing unit 416 during the second touch sensing period TT2 and the third touch sensing period TT3 to sense capacitance generated by a touch made by the active pen 220 or a finger touch. In one embodiment, the channel selector 412 includes a plurality of multiplexers (not shown) to selectively connect the plurality of touch lines T1 to Tk to the touch sensing unit 416 by being switched according to the touch synchronization signal Tsync and a channel selection signal CSS.

Meanwhile, the channel selector 412 may supply a common voltage Vcom to the plurality of touch electrodes TE through each of the plurality of touch lines T1 to Tk during the display periods DP1 to DPn of the touch synchronization signal Tsync.

The touch driver 414 generates the uplink signal or the touch driving signal and supplies the generated uplink signal or touch driving signal to the touch electrode TE through each of the touch lines T1 to Tk connected to the channel selector 412.

Specifically, during the first touch sensing period TT1 of the one frame period as shown in FIG. 3, the touch driver 414 generates the uplink signal and supplies the uplink signal to the touch electrode TE through each of the touch lines T1 to Tk, and during the plurality of third touch sensing periods TT3 of the one frame period, the touch driver 414 generates the touch driving signal and supplies the touch driving signal to the touch electrode TE through each of the touch lines T1 to Tk.

In this case, the uplink signal may include panel information of the display panel 300, a protocol version, or the like. In particular, according to the present disclosure, the uplink signal may further include information on a length of a pre-driving section during which a phase error of the downlink signal is detected or the number of pulses of the downlink signal for setting the pre-driving section.

Since the uplink signal is transmitted to the active pen 220 through the touch electrode TE, the active pen 220 may confirm the information of the display panel 300, the protocol version, and the number of pulses (or the length of the pre-driving section) of the downlink signal to be used for detecting the phase error and may generate the downlink signal.

In one embodiment, the touch driver 414 may generate the uplink signal or the touch driving signal using a driving signal DS having a plurality of driving pulses that swing between a high voltage and a low voltage with respect to a reference common voltage.

Meanwhile, the touch driver 414 may supply the common voltage Vcom to each of the plurality of touch electrodes TE through each of the plurality of touch lines T1 to Tk during the display periods DP1 to DPn of the touch synchronization signal Tsync.

In FIG. 4, it is described that the touch driver 414 directly inputs the uplink signal or the touch driving signal to the channel selector 412, but in a modified embodiment, the touch driver 414 may input the uplink signal or the touch driving signal to the channel selector 412 through the touch sensing unit 416.

The touch sensing unit 416 operates in a phase error detection mode to detect the phase error of the downlink signal using the downlink signal transmitted from the active pen 220, or operates in a sensing mode to sense the downlink signal or a finger touch to generate touch raw data.

To this end, as shown in FIG. 3, the second touch sensing period TT2 may include a pre-driving section P1 and an active driving section P2, and the touch sensing unit 416 operates in the phase error detection mode during the pre-driving section P1 and operates in the sensing mode during the active driving section P2. The pre-driving section P1 may include a first period P11 during which the phase error is detected and a second period P12 during which the detected phase error is compensated.

Hereinafter, for convenience of description, of the downlink signals, the downlink signal transmitted from the active pen 220 during the pre-driving section P1 is denoted as a first downlink signal D1, and the downlink signal transmitted from the active pen 220 during the active driving section P2 is denoted as a second downlink signal D2.

In one embodiment, as shown in FIG. 3, during the pre-driving section P1, the touch sensing unit 416 operates in the phase error detection mode to detect the phase error of the downlink signal using the first downlink signal D1 transmitted from the active pen 220. When it is determined that the phase error is detected, the touch sensing unit 416 compensates for the phase error by adjusting an internal timing signal of the touch IC 410 on the basis of the detected phase error.

Further, as shown in FIG. 3, during the active driving section P2, the touch sensing unit 416 operates in the sensing mode to sense a touch made by the active pen 220 using the second downlink signal D2 and generate first touch raw data. The touch controller 420 determines at least one of the pen data and the pen touch coordinates, which are received from the active pen 220, using the first touch raw data generated by the touch sensing unit 416 and the internal timing signal whose phase error is compensated. Hereinafter, for convenience of description, a description will be made assuming that the second touch sensing period TT2 is "2LHB" during which the pen touch coordinates are sensed.

Meanwhile, during the third touch sensing period TT3, the touch sensing unit 416 senses a finger touch to generate second touch raw data and determines coordinates of the finger touch using the generated second touch raw data.

Hereinafter, a configuration of the touch sensing unit 416 according to one embodiment of the present disclosure will be described in more detail with reference to FIG. 5.

Figure 5:
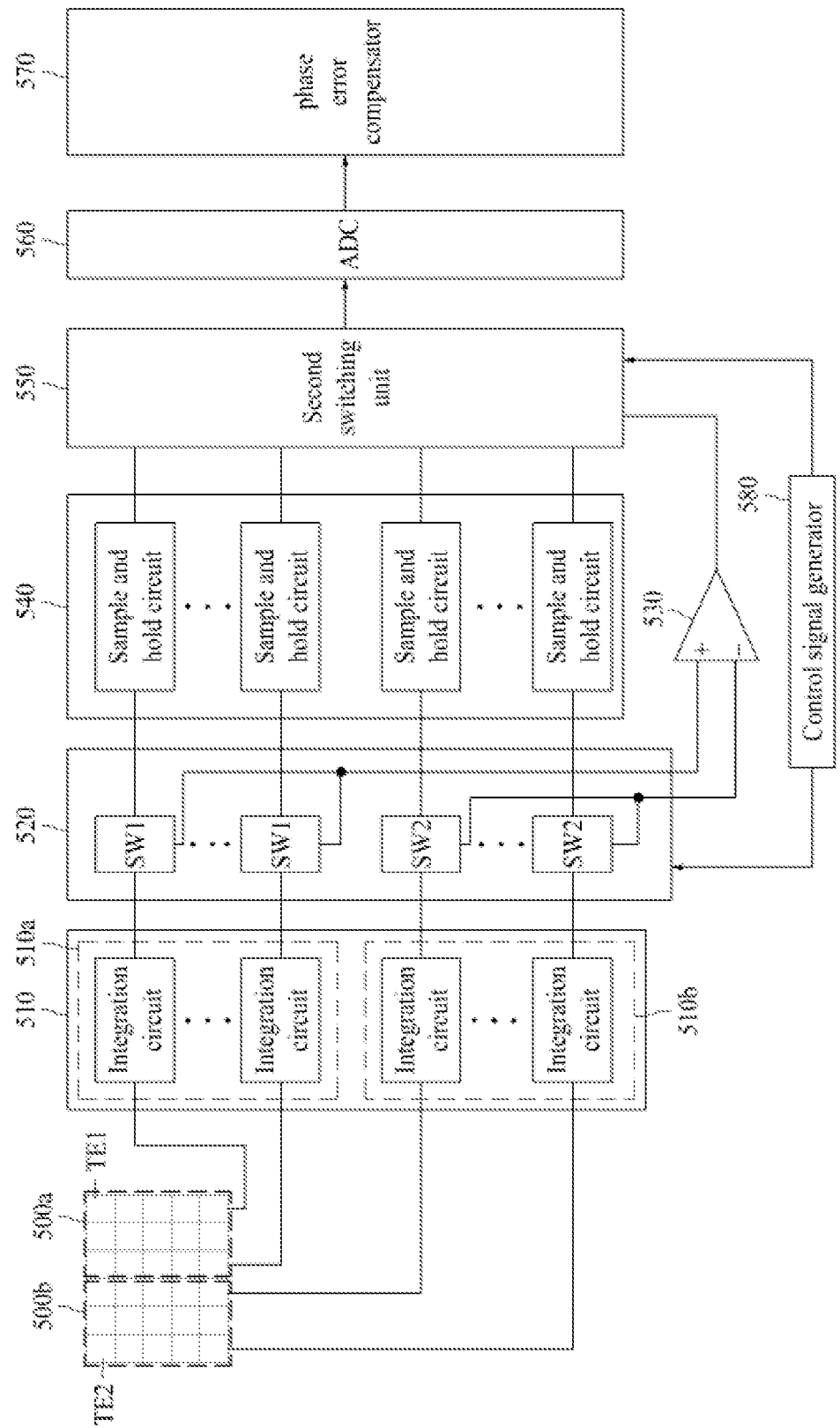
FIG. 5 is a schematic block diagram illustrating a configuration of a touch integrated circuit (IC) according to one embodiment of the present disclosure.

FIG. 5 is a schematic block diagram illustrating a configuration of the touch sensing unit according to one embodiment of the present disclosure. As shown in FIG. 5, the touch sensing unit 416 according to one embodiment of the present disclosure includes a plurality of integration circuits 510, a first switching unit 520, a differential amplifier 530, a plurality of sample and hold circuits 540, a second switching unit 550, an analog-to-digital converter (ADC) 560, a phase error compensator 570, and a control signal generator 580.

Hereinafter, for convenience of description, a configuration related to functions when the touch sensing unit 416 operates in the phase error detection mode will be described first, and then, a configuration related to functions when the touch sensing unit 416 operates in the sensing mode will be described.

When the first downlink signal D1 is generated in the touch electrodes TE during the pre-driving section P1 of the second touch sensing period TT2, the plurality of integration circuits 510 may operate in the phase error detection mode to accumulate a capacitance according to the first downlink signal D1 received from each of the touch electrodes TE. In one embodiment, the plurality of integration circuits 510 according to the present disclosure may be configured as first integration circuits 510a and second integration circuits 510b. The first integration circuits 510a are respectively connected to a plurality of first touch electrodes TE1 included in a first touch group 500a and The second integration circuits 510b are respectively connected to a plurality of second touch electrodes TE2 included in a second touch group 500b.

In this case, the first integration circuits 510a respectively connected to the first touch electrodes TE1 receive and accumulate a capacitance according to the first downlink signal D1 from each of the first touch electrodes TE1.

Further, the second integration circuits 510b respectively connected to the second touch electrodes TE2 receive and accumulate a capacitance according to the first downlink signal D1 from each of the second touch electrodes TE2.

In one embodiment, the first and second integration circuits 510a and 510b may accumulate the capacitance in a positive direction when phase information of the first downlink signal D1 is changed from a first level to a second level higher than the first level. The first and second integration circuits 510a and 510b may accumulate the capacitance in a negative direction when the phase information of the first downlink signal D1 is changed from the second level to the first level.

Figure 6:
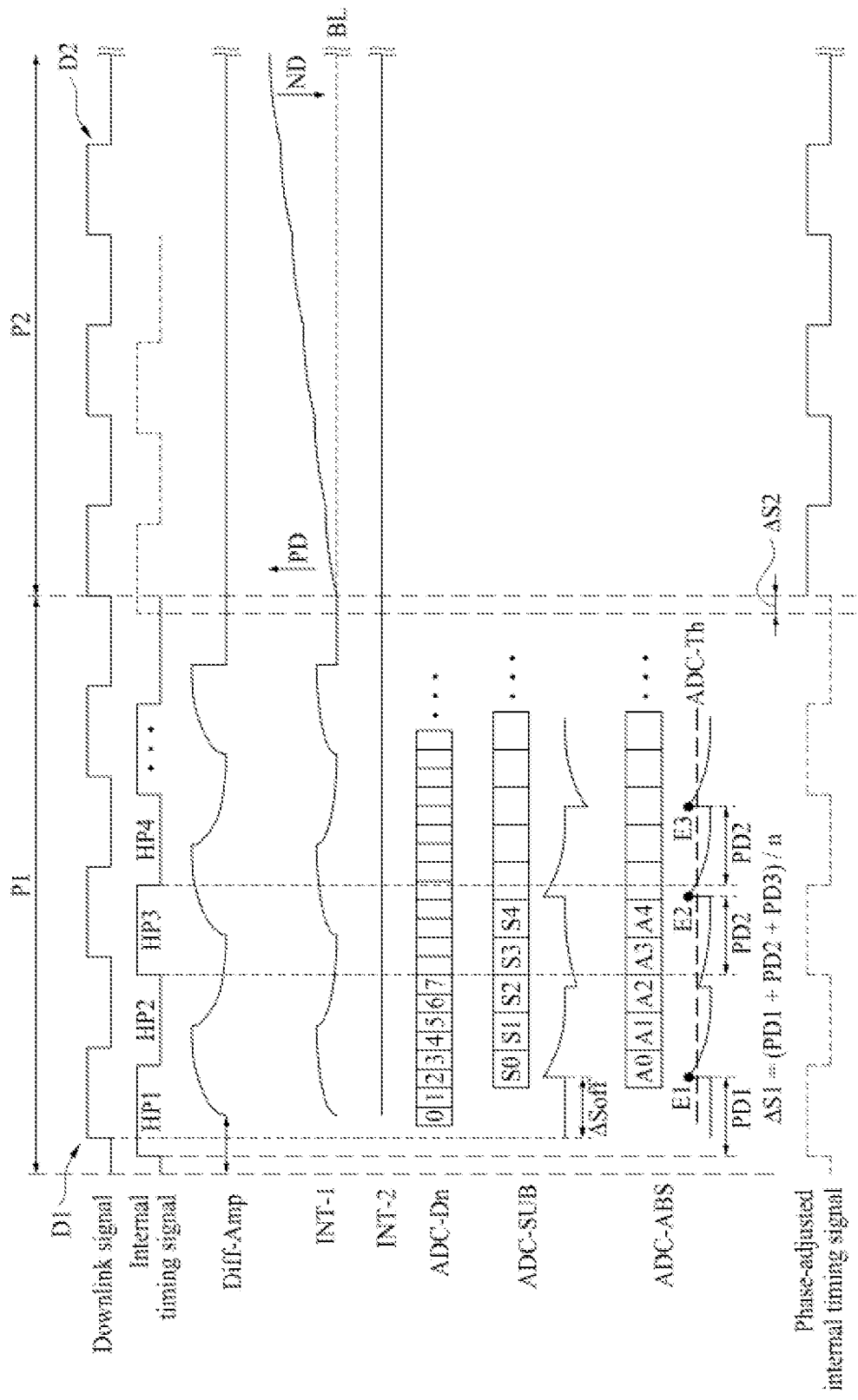
FIG. 6 is a timing diagram of signals generated by the touch sensing device according to one embodiment of the present disclosure.

At this point, as shown in FIG. 6, among the plurality of first and second integration circuits 510a and 510b, only the integration circuit connected to the touch electrode TE which receives the first downlink signal D1 during the pre-driving section P1 outputs an accumulated capacitance value INT_1. The integration circuits connected to the touch electrodes TE which does not receives the first downlink signal D1 during the pre-driving section P1 output an output signal maintained at a reference value INT_2.

Figure 7:
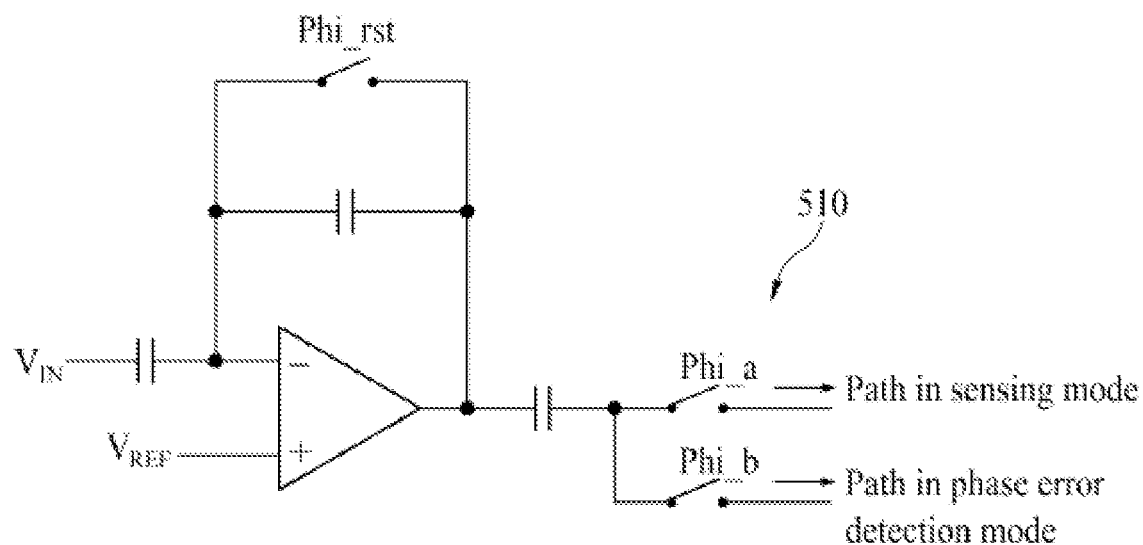
FIG. 7 is a block diagram illustrating an example of an integration circuit shown in FIG. 4.
Figure 8:
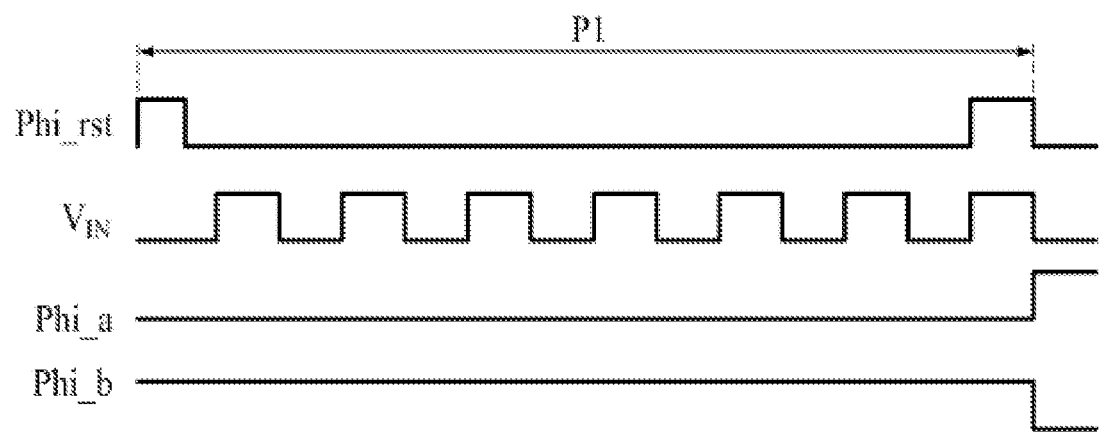
FIG. 8 is a diagram illustrating an operation timing of the integration circuit shown in FIG. 7.

In one embodiment, the first and second integration circuits 510a and 510b may each include an amplifier having a structure as shown in FIG. 7. When each of the first and second integration circuits 510a and 510b is implemented as an amplifier as shown in FIG. 7, a first switch Phi_a, a second switch Phi_b, and a reset switch Phi_rst of each of the integration circuits 510a and 510b are turned on and off according to a timing shown in FIG. 8 during the pre-driving section P1. In this case, it can be seen that the first switch Phi_a is turned off during the pre-driving section P1 and is turned on during the active driving section P2, and the second switch Phi_b is turned on during the pre-driving section P1 and is turned off during the active driving section P2.

Referring again to FIG. 5, the first switching unit 520 connects the plurality of integration circuits 510 to the differential amplifier 530 in response to a control signal received from the control signal generator 580 or respectively connects the plurality of integration circuits 510 to the sample and hold circuits 540 respectively provided for the integration circuits 510. Specifically, the first switching unit 520 connects the plurality of integration circuits 510 to the differential amplifier 530 when a first control signal indicating the phase error detection mode is received from the control signal generator 580, and connects the plurality of integration circuits 510 to the sample and hold circuits 540 when a second control signal indicating the sensing mode is received.

To this end, the first switching unit 520 may include first and second switches SW1 and SW2 respectively provided for the integration circuits 510 in order to selectively connect each of the integration circuits 510 to the differential amplifier 530 or each of the sample and hold circuits 540.

In accordance with such an embodiment, when the first control signal is received from the control signal generator 580 during the pre-driving section P1, the first and second switches SW1 and SW2 connect each of the integration circuits 510 to the differential amplifier 530. At this point, the first switches SW1 connected to the first integration circuits 510a connect the first integration circuits 510a to a first input terminal (e.g., a non-inverting input terminal) of the differential amplifier 530 in response to the first control signal. In addition, the second switches SW2 connected to the second integration circuits 510b connect the second integration circuits 510b to a second input terminal (e.g., an inverting input terminal) of the differential amplifier 530 in response to the first control signal. Here, the first integration circuits 510a connected to the first input terminal of the differential amplifier 530 and the second integration circuits 510b connected to the second input terminal thereof may be determined in advance.

Meanwhile, when the second control signal is received from the control signal generator 580 during the active driving section, the first and second switches SW1 and SW2 connect the respective integration circuits 510 to the sample and hold circuits 540 mapped to the corresponding integration circuits 510.

The differential amplifier 530 generates an output signal Diff_Amp on the basis of accumulated capacitance values (hereinafter, referred to as a "first accumulated capacitance value") input from the first integration circuits 510a through the first input terminal during the pre-driving section P1 and accumulated capacitance values (hereinafter, referred to as a "second accumulated capacitance value") input from the second integration circuits 510b through the second input terminal during the pre-driving section P1. Specifically, the differential amplifier 530 calculates a difference value between the first accumulated capacitance value and the second accumulated capacitance value and amplifies the calculated difference value, thereby generating the output signal Diff_Amp. For example, as shown in FIG. 6, the differential amplifier 530 outputs the output signal Diff_Amp generated by amplifying the difference value between the first accumulated capacitance value and the second accumulated capacitance value.

The second switching unit 550 connects the differential amplifier 530 to the ADC 560 during the pre-driving section P1 and selectively connects each of the sample and hold circuits 540 to the ADC 560 during the active driving section P2. To this end, the second switching unit 550 may include a plurality of switches (not shown) for selectively connecting the differential amplifier 530 and the plurality of sample and hold circuits 540 to the ADC 560.

During the pre-driving section P1, the ADC 560 converts the output signal Diff_Amp, which is output from the differential amplifier 530, into digital data ADC_Dn according to a predetermined first sampling period. Specifically, during the pre-driving section P1, the ADC 560 continuously operates according to the predetermined first sampling period to convert the output signal Diff_Amp, which is output from the differential amplifier 530, into digital data and continuously output the digital data.

Meanwhile, during the active driving section P2, the ADC 560 converts the signal output from the sample and hold circuit 540 into digital data according to a second sampling period longer than the first sampling period and outputs the digital data.

During the pre-driving section P1, the phase error compensator 570 detects an edge of the first downlink signal D1 on the basis of a difference value between current and previous values of the digital data ADC_Dn output from the ADC 560 for every first sampling period. In addition, the phase error compensator 570 compares the detected edge of the first downlink signal D1 with an edge of the internal timing signal to detect a phase error $\Delta S2$ (in FIG. 6). Here, the internal timing signal may be a signal generated to have the same frequency as the first downlink signal D1.

Hereinafter, a configuration of the phase error compensator 570 according to the present disclosure will be described in more detail with reference to FIG. 9.

Figure 9:
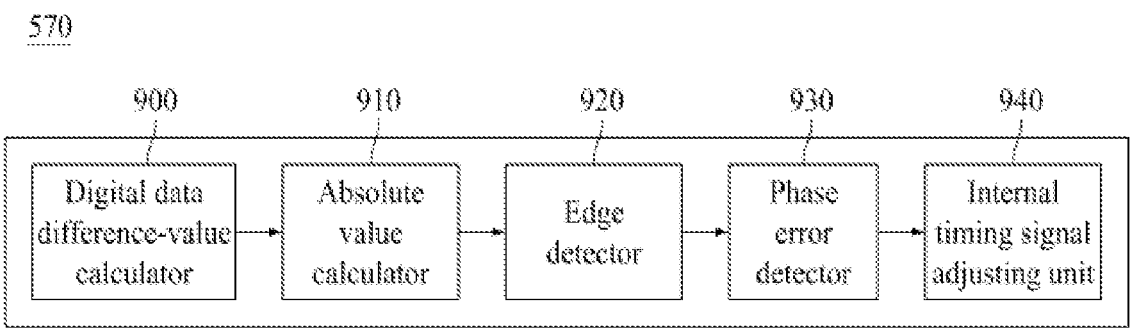
FIG. 9 is a schematic block diagram illustrating a configuration of a phase error compensator shown in FIG. 5.

FIG. 9 is a schematic block diagram illustrating a configuration of the phase error compensator according to one embodiment of the present disclosure. As shown in FIG. 9, the phase error compensator 570 according to one embodiment of the present disclosure includes a digital data difference-value calculator 900, an absolute value calculator 910, an edge detector 920, a phase error detector 930, and an internal timing signal adjusting unit 940.

During the pre-driving section P1, the digital data difference-value calculator 900 calculates a difference value ADC_SUB between the current and previous values of the digital data ADC_Dn output from the ADC 560 for every first sampling period. For example, as shown in FIG. 6, when the ADC 560 sequentially outputs a first digital data 0, a second digital data 1, a third digital data 2, and the like according to the first sampling period, the digital data difference-value calculator 900 calculates a first difference value S0 between the second digital data 1, which is the current value, and the first digital data 0, which is the previous value, at a time point at which the second digital data 1 is output. In addition, the digital data difference-value calculator 900 calculates a second difference value S1 between the third digital data 2, which is the current value, and the second digital data 1, which is the previous value, at a time point at which the third digital data 2 is output.

As described above, during the pre-driving section P1, the digital data difference-value calculator 900 calculates the difference value between the current and previous values whenever the digital data ADC_Dn is output from the ADC 560 and outputs the difference value to the absolute value calculator 910.

The absolute value calculator 910 calculates an absolute value ADC_ABS of each of the difference values output from the digital data difference-value calculator 900. For example, as shown in FIG. 6, the absolute value calculator 910 calculates a first absolute value A0 for the first difference value S0 and a second absolute value A1 for the second difference value S1 that are calculated by the digital data difference-value calculator 900. At this point, as shown in FIG. 6, it can be seen that since the first and second difference values S0 and S1 are positive values, absolute values are the same as the difference values, but since a third difference value S2 is a negative value, an absolute value is changed to a positive value.

The reason for calculating the absolute value for each of difference values of the digital data through the absolute value calculator 910 in the present disclosure as described above is to exclude, points corresponding to the difference values of the digital data that are less than a predetermined threshold value ADC_Th among the difference values of the digital data, from edge candidates.

The edge detector 920 detects the edge of the first downlink signal D1 on the basis of the absolute values calculated by the absolute value calculator 910. Specifically, the edge detector 920 selects an absolute value exceeding the predetermined threshold value ADC_Th among the absolute values calculated by the absolute value calculator 910 and determines a point at which an absolute value (hereinafter referred to as a "maximum absolute value") having the largest value is detected in each half phase section HP of the internal timing signal as a position at which the edge of the first downlink signal D1 is present.

As an example, as shown in FIG. 6, during a first half-phase section HP1 of the internal timing signal, the maximum absolute value exceeds the threshold value ADC_Th, and thus a point at which the maximum absolute value is detected is determined as a position at which an edge E1 is present. However, during a second half-phase section HP2, the maximum absolute value does not exceed the threshold value ADC_Th, and thus it is determined that the edge is not detected during the second half-phase section HP2. In addition, during a third half-phase section HP3, the maximum absolute value exceeds the threshold value ADC_Th, and thus, a point, at which the maximum absolute value is detected, is detected as an edge E2, and during a fourth half-phase section HP4, the maximum absolute value exceeds the threshold value ADC_Th, and thus, a point, at which the maximum absolute value is detected, is detected as an edge E3.

The phase error detector 930 calculates a phase difference between the edge detected by the edge detector 920 for each half phase and the edge of the internal timing signal. At this point, the phase error detector 930 calculates a phase difference between the edge detected for each half phase and the edge of the internal timing signal, which precedes the corresponding edge in the half-phase section during which the corresponding edge is detected.

The phase error detector 930 sums the calculated phase differences for all of the edges detected during each half-phase section and divides the summed result value by the numbers n of the edges detected by the edge detector 920, thereby calculating a signal delay value $\Delta S1$.

For example, in the example illustrated in FIG. 6, three edges E1, E2, and E3 are detected by the edge detector 920, and thus the phase error detector 930 calculates a first phase difference PD1 between a first edge E1 and an edge of the internal timing signal that precedes the first edge E1 in the first half-phase section HP1, calculates a second phase difference PD2 between a second edge E2 and an edge of the internal timing signal that precedes the second edge E2 in the third half-phase section HP3, and calculates a third phase difference PD3 between a third edge E3 and an edge of the internal timing signal that precedes the third edge E3 in the fourth half-phase section. Thereafter, the phase error detector 930 calculates the signal delay value $\Delta S1$ by dividing a result value obtained by summing the calculated first to third phase differences by the numbers of edges (n=3).

When the signal delay value $\Delta S1$ is calculated, the phase error detector 930 calculates a phase error $\Delta S2$ by subtracting an offset delay $\Delta Soff$ from the calculated signal delay value $\Delta S1$. In one embodiment, the offset delay $\Delta Soff$ may include an offset of the display panel 300 and an offset of the ADC 560. In this case, a delay of the display panel 300 may be set differently for each of the touch electrodes TE according to a position at which a touch is generated. As an example, the offset may be set to be proportional to a separation distance between the touch electrode TE at which the touch is occurred and the touch sensing device 320.

In accordance with such an embodiment, as the separation distance between the touch electrode TE at which a touch is occurred and the touch sensing device 320 becomes larger, the offset of the display panel 300 is set to a larger value, and as the separation distance between the touch electrode TE at which the touch is occurred and the touch sensing device 320 becomes smaller, the offset of the display panel 300 may be set to a smaller value.

The internal timing signal adjusting unit 940 delays the internal timing signal by as much as the phase error $\Delta S2$ calculated by the phase error detector 930, thereby compensating for the phase error $\Delta S2$ of the internal timing signal. As shown in FIG. 6, the internal timing signal adjusting unit 940 delays the internal timing signal by as much as the phase error $\Delta S2$ to allow the internal timing signal to be synchronized with the downlink signal.

Referring again to FIG. 5, the control signal generator 580 generates the first or second control signal according to the driving mode of the touch sensing device 320 and outputs the first or second control signal to the first and second switching units 520 and 550. Specifically, when the touch sensing device 320 operates in the phase error detection mode during the pre-driving section P1, the control signal generator 580 generates the first control signal indicating an operation according to the phase error detection mode and outputs the first control signal to the first and second switching units 520 and 550. Accordingly, the first switching unit 520 connects each of the integration circuits 510 to the differential amplifier 530, and the second switching unit 550 connects the differential amplifier 530 to the ADC 560.

In addition, when the touch sensing device 320 operates in the sensing mode during the active driving section P2, the control signal generator 580 generates the second control signal indicating an operation according to the sensing mode and outputs the second control signal to the first and second switching units 520 and 550. Accordingly, the first switching unit 520 respectively connects the integration circuits 510 to the sample and hold circuits 540, and the second switching unit 550 selectively connects each of the sample and hold circuits 540 to the ADC 560.

In addition, the control signal generator 580 may also generate the internal timing signal and output the internal timing signal to the phase error compensator 570.

Meanwhile, when the plurality of integration circuits 510 operate in the sensing mode during the active driving section P2, as shown in FIG. 6, the plurality of integration circuits 510 accumulate a capacitance according to the second downlink signal D2 received during the active driving section P2 of the second touch sensing period TT2. Specifically, the plurality of integration circuits 510 are connected to the touch lines T1 to Tk through the channel selector 412 and accumulate the capacitance according to the second downlink signal D2, which is received from the active pen 220, on the touch electrode TE connected to the corresponding touch line among the touch lines T1 to Tk.

In one embodiment, the plurality of integration circuits 510 may determine a phase of the second downlink signal D2 using phase information of the second downlink signal D2 received during the active driving section P2 and then may determine a direction, in which the second downlink signal D2 is accumulated, according to the determined phase.

Specifically, when the phase information of the second downlink signal D2 is a first level, as shown in FIG. 6, the plurality of integration circuits 510 accumulate the capacitance according to the second downlink signal D2 from a base line BL in a positive direction PD. Meanwhile, although not shown in the drawings, when the phase information of the second downlink signal D2 is a second level, the plurality of integration circuits 510 accumulate the capacitance according to the second downlink signal D2 from the base line BL in a negative direction ND.

For example, the plurality of integration circuits 510 may determine that the second downlink signal D2 has a first phase when a first pulse of the second downlink signal D2 starts with a high level and may determine that the second downlink signal D2 has a second phase when the first pulse of the second downlink signal D2 starts with a low level.

In the above-described embodiment, it has been described that the plurality of integration circuits 510 determine the phase of the second downlink signal D2 using the phase information of the second downlink signal D2. However, the plurality of integration circuits 510 according to the present disclosure may also determine the phase of the second downlink signal D2 using the phase information of the first downlink signal D1 or may additionally receive a separate third downlink signal (not shown) for determining the phase of the second downlink signal D2. In accordance with such an embodiment, the plurality of integration circuits 510 may determine the phase of the second downlink signal D2 using phase information of the third downlink signal.

Meanwhile, during the third touch sensing period TT3, the plurality of integration circuits 510 may be connected to the touch lines T1 to Tk through the channel selector 412 and receive and accumulate the capacitance, which is generated by the finger touch, on the touch electrode TE connected to the corresponding touch line among the touch lines T1 to Tk.

During the active driving section P2, the sample and hold circuits 540 receive accumulated capacitance values output from the plurality of integration circuits 510, perform sampling, holding, and amplifying (SHA) processing on the accumulated capacitance values, and supply the processed values to the ADC 560.

During the active driving section P2, the ADC 560 converts the accumulated capacitance value selectively received from the sample and hold circuits 540 through the second switching unit 550 into a digital value to generate first or second touch raw data. Here, the first touch raw data refers to touch raw data according to the reception of the downlink signal, and the second touch raw data refers to touch raw data made by a finger touch.

The ADC 560 transmits the generated first and second touch raw data to the touch controller 420.

During the active driving section P2, the touch controller 420 generates at least one of pen data and pen touch coordinates of the active pen 220 on the basis of the first touch raw data generated by the ADC 560 and the internal timing signal compensated for by the phase error compensator 570. In addition, during the active driving section P2, the touch controller 420 generates finger touch coordinates on the basis of the second touch raw data generated by the ADC 560.

As an example, the touch controller 420 may calculate an increment in which the first touch raw data increases in the positive direction from the base line or a decrement in which the first touch raw data decreases in the negative direction from the base line, and determine the calculated increment or decrement as pen touch intensity. The touch controller 420 calculates the pen touch coordinates using the determined pen touch intensity. For example, the touch controller 420 may determine coordinates of the touch electrode TE in which the calculated pen touch intensity exceeds a threshold value as the pen touch coordinates.

The touch controller 420 may compare the second touch raw data with a predetermined reference value to determine the coordinates of the touch electrodes TE, in which the second touch raw data exceeds the reference value, as the finger touch coordinates.

Meanwhile, when a phase error detected by the phase error detector 930 is greater than or equal to a half phase (e.g., 180° or more), the internal timing signal compensated for by the internal timing signal adjusting unit 940 may be synchronized with a phase of the first downlink signal D1 in a state of having a difference of a half phase. Accordingly, in such a case, the touch controller 420 compares the phase information of the second downlink signal D2 with the phase information of the internal timing signal whose phase error is compensated, and when the phase of the second downlink signal D2 is opposite to the phase of the internal timing signal, the touch controller 420 determines that the phases are synchronized with each other with a phase error of the half phase or more, thereby inverting the phase of the touch raw data transmitted from the ADC 560. Accordingly, the touch controller 420 generates the pen data and the pen coordinates on the basis of the inverted touch raw data.

Meanwhile, in the above-described embodiment, the description is made assuming that the second touch sensing period TT2 is the touch sensing period (e.g., "2LHB") during which the pen touch coordinates are sensed, but the second touch sensing period TT2 may be the touch sensing period (e.g., "4LHB") during which the pen data is sensed. In accordance with such an embodiment, the touch sensing device 320 may divide the active driving section P2 of the second touch sensing period TT2 into a plurality of unit sections, accumulate the capacitance according to the second downlink signal D2 for each unit section, convert the accumulated capacitance value generated for each unit section into digital data, and generate the first touch raw data for each unit section.

Thereafter, the touch sensing device 320 compares the first touch raw data generated for each unit section with a predetermined reference value to convert the first touch raw data into any one of a first value (e.g., 1) or a second value (e.g., 0). Thereafter, the touch sensing device 320 may generate one piece of binary data for one second touch sensing period TT2 by sequentially arranging the first value or the second value generated for each unit section included in one second touch sensing period TT2, and generate pen data by sequentially arranging the binary data of all the second touch sensing periods TT2 included in the one frame. Accordingly, the pen data generated by the touch sensing device 320 may be generated in units of one frame.

In the above-described embodiment, it is described that the touch electrodes TE are grouped into two touch groups. However, in another embodiment, the touch electrodes TE may be grouped into four or more touch groups. In the present embodiment, the reason for grouping the touch electrodes TE into four or more touch groups is that when the touch electrodes TE are grouped into four or more touch groups, the number of touch electrodes included in one touch group may be reduced, and in this case, the change in capacitance generated by the active pen 220 increases so as to increase sensing sensitivity.

In accordance with such an embodiment, the touch IC 410 includes a plurality of differential amplifiers and a plurality of ADCs, and the differential amplifiers are respectively connected to the ADCs.

Figure 10:
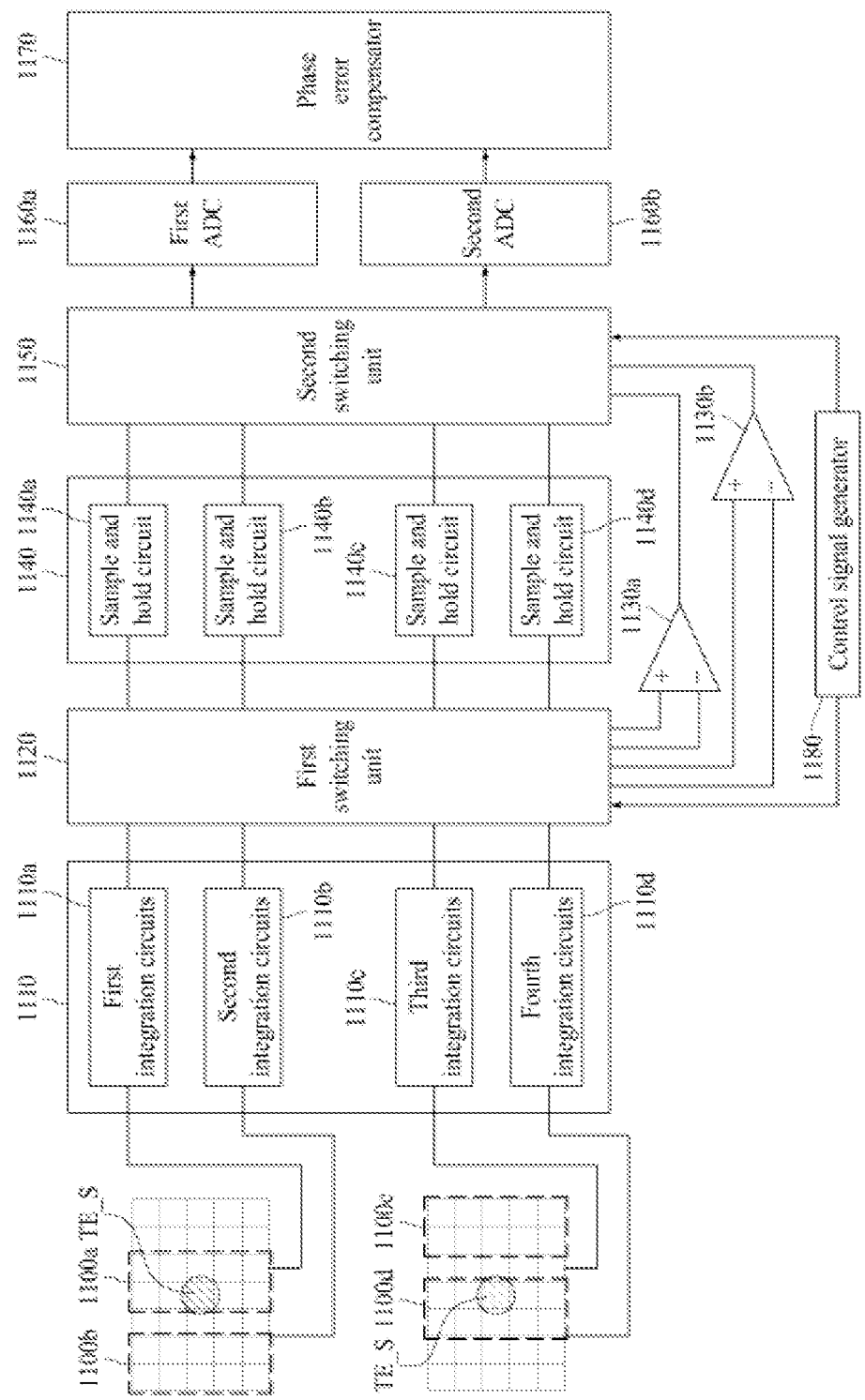
FIG. 10 is a schematic block diagram illustrating a configuration of a touch IC according to another embodiment of the present disclosure.

As an example, as shown in FIG. 10, when the touch electrodes TE are grouped into first to fourth touch groups 1100a to 1100d, a plurality of integration circuits 1110 may be configured as first integration circuits 1110a connected to the first touch group 1100a, second integration circuits 1110*b* connected to the second touch group 1100*b*, and third integration circuits 1110*c* connected to the third touch group 1100*c*, and fourth integration circuits 1110*d* connected to the fourth touch group 1100*d*. In this case, the first and second integrating circuits 1110*a* and 1110*b* are connected to a first differential amplifier 1130*a*, and the third and fourth integration circuits 1110*c* and 1110*d* are connected to a second differential amplifier 1130*b*.

At this point, during the pre-driving section P1, a first switching unit 1120 connects the first integration circuits 1110*a* to a first input terminal (e.g., a non-inverting input terminal) of the first differential amplifier 1130*a* and connects the second integration circuits 1110*b* to a second input terminal (e.g., an inverting input terminal) of the first differential amplifier 1130*a*. In addition, during the active driving section P2, the first switching unit 1120 connects the first integration circuits 1110*a* to sample and hold circuits 1140*a*, which are respectively mapped to the first integration circuits 1110*a*, and connects the second integration circuits 1110*b* to sample and hold circuits 140*b* that are respectively mapped to the second integration circuits 1110*b*.

Further, during the pre-driving section P1, the first switching unit 1120 connects the third integration circuits 1110*c* to a first input terminal (e.g., a non-inverting input terminal) of the second differential amplifier 1130*b*, and connects the fourth integration circuits 1110*d* to a second input terminal (e.g., an inverting input terminal) of the second differential amplifier 1130*b*. In addition, during the active driving section P2, the first switching unit 1120 connects the third integration circuits 1110*c* to sample and hold circuits 1140*c* which are respectively mapped to the third integration circuits 1110*c* and connects the fourth integration circuits 1110*d* to sample and hold circuits 1140*d* that are respectively mapped to the fourth integration circuits 1110*d*.

A first ADC 1160*a* is connected to the first differential amplifier 1130*a* through a second switching unit 1150 and converts a first output signal output from the first differential amplifier 1130*a* into first digital data, and a second ADC 1160*b* is connected to the second differential amplifier 1130*b* through the second switching unit 1150 and converts a second output signal output from the second differential amplifier 1130*b* into second digital data.

A phase error compensator 1170 sums the first digital data output from the first ADC 1160*a* and the second digital data output from the second ADC 1160*b* to calculate final digital data, and detects the edge of the first downlink signal on the basis of a difference value between current and previous values of the final digital data. The phase error compensator 1170 detects and compensates for the phase error of the first downlink signal D1 by comparing the detected edge with the edge of the internal timing signal.

In accordance with the above-described embodiment, some touch electrodes TE_S among the touch electrodes included in the first touch group 1100*a* and some touch electrodes TE_S among the touch electrodes included in the fourth touch group 1100*d* may be shared with each other. As another example, although not shown in the drawings, some of the touch electrodes included in the second touch group 1100*b* and some of the touch electrodes included in the third touch group 1100*c* may be shared with each other. In this case, the shared touch electrode TE_S may be determined as a touch electrode in which a touch is generated in a previous frame. As described above, by allowing the first and fourth touch groups 1100*a* and 1100*d* to share some touch electrodes TE_S, it is possible to compensate for a reduction in sensitivity to a touch boundary position that may occur due to the use of the plurality of ADCs 1160*a* and 1160*b*.

Hereinafter, a method of compensating for a phase error of an active pen (hereinafter, referred to as a "phase error compensation method") according to one embodiment of the present disclosure will be described with reference to FIG. 11.

Figure 11:
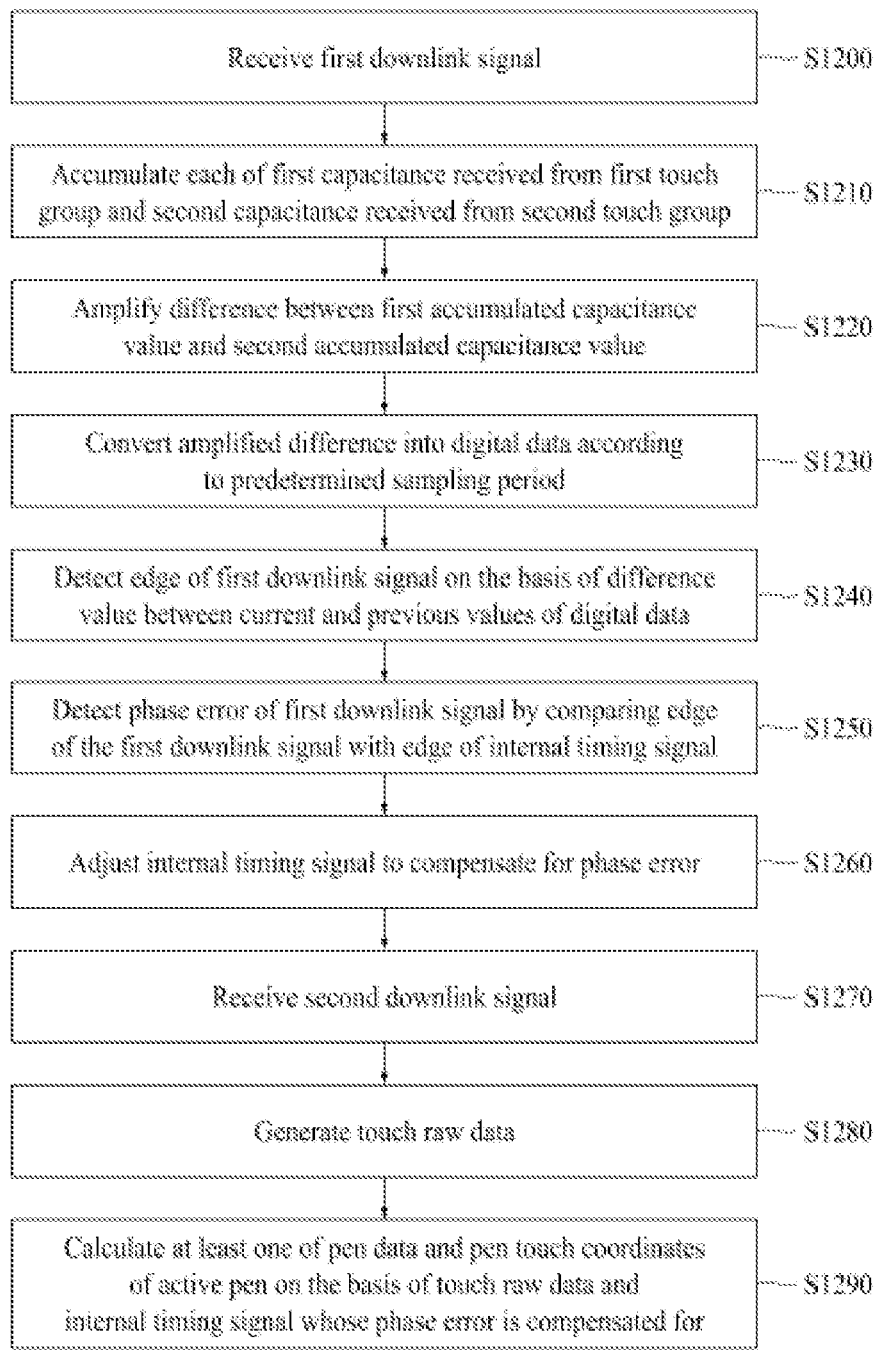
FIG. 11 is a flowchart illustrating a phase error compensation method according to one embodiment of the present disclosure.

FIG. 11 is a flowchart illustrating the phase error compensation method according to one embodiment of the present disclosure. The phase error compensation method as shown in FIG. 11 may be performed by a touch sensing device having the configuration as shown in FIGS. 4, 5, and 9. Further, in accordance with the present embodiment, a touch sensing period may include a pre-driving section P1 and an active driving section P2, and a downlink signal transmitted from an active pen may include a first downlink signal and a second downlink signal.

First, when a first downlink signal D1 generated by the active pen is received during the pre-driving section P1 (S1200), the touch sensing device accumulates a first capacitance, which is received from a first touch group including a plurality of touch electrodes, and accumulates a second capacitance, which is received from a second touch group including a plurality of touch electrodes, according to the first downlink signal (S1210).

Thereafter, the touch sensing device amplifies a difference between a first accumulated capacitance value obtained by accumulating the first capacitance and a second accumulated capacitance value obtained by accumulating the second capacitance (S1220).

Thereafter, the touch sensing device converts the difference amplified in S1220 into digital data according to a predetermined sampling period (S1230).

Thereafter, the touch sensing device detects an edge of the first downlink signal on the basis of a difference value between current and previous values of the digital data converted in S1230 (S1240).

Specifically, the touch sensing device calculates the difference value between the current and previous values of the digital data output from an ADC for each sampling period and then calculates an absolute value of the calculated difference value. Thereafter, the touch sensing device determines a time point corresponding to a maximum absolute value among a plurality of absolute values calculated during a half-phase section of an internal timing signal as the edge of the first downlink signal. In one embodiment, the touch sensing device may select absolute values greater than a predetermined threshold value among the plurality of absolute values and detect the time point corresponding to the maximum absolute value among the selected absolute values for each half-phase section of the internal timing signal as the edge of the first downlink signal.

Thereafter, the touch sensing device detects a phase error of the first downlink signal by comparing the edge of the first downlink signal detected in S1240 with an edge of the internal timing signal (S1250).

Specifically, the touch sensing device may detect the phase error by subtracting an offset of the ADC and an offset of the display panel from a signal delay value calculated on the basis of the phase difference between the edge of the first downlink signal and the edge of the internal timing signal. In this case, when a plurality of edges are detected for the first downlink signal during the pre-driving section, the touch sensing device may calculate the signal delay value by dividing a result value obtained by summing the phase differences between the detected edges of the first downlink signals and edges of the internal timing signal by the number of edges of the first downlink signal detected during the pre-driving section.

Thereafter, the touch sensing device adjusts the internal timing signal according to the detected phase error to compensate for the phase error (S1260). In one embodiment, the touch sensing device may compensate for the phase error by delaying the internal timing signal by as much as the detected phase error.

Thereafter, when the second downlink signal is received during the active driving section (S1270), the touch sensing device generates touch raw data on the basis of the received second downlink signal (S1280).

Thereafter, the touch sensing device calculates at least one of pen data and pen touch coordinates of the active pen on the basis of the touch raw data generated in S1280 and the internal timing signal whose phase error is compensated in S1260 (S1290). A method of generating at least one of the pen data and the pen touch coordinates on the basis of the touch raw data by the touch sensing device has been described in detail in the above-described description of the touch controller, and thus a description thereof will be omitted.

According to the present disclosure, a display device can compensate for a phase error of a downlink signal transmitted from an active pen even without transmitting and receiving a separate synchronization signal, and thus there is an effect of reducing power consumption due to the transmission of the synchronization signal.

Further, according to the present disclosure, an internal timing signal of a touch sensing device can be synchronized to a downlink signal regardless of the type of an active pen, and thus there is an effect of improving the degree of freedom of selection for the active pen.

Further, according to the present disclosure, a separate comparator for synchronizing an internal timing signal is not required. Thus, an increase in size of a touch sensing device and an increase in manufacturing cost can be prevented, and thus there is an effect of reducing manufacturing costs of the touch sensing device and a display device including the same. In addition, it is also not required to confirm whether an output is made from the comparator, determine whether there is noise in the output of the comparator, and a reset driving of the comparator, and thus there is an effect of simplifying a driving mechanism of the touch sensing device.

It should be understood by those skilled in the art that the present disclosure can be embodied in other specific forms without changing the technical concept and essential features of the present disclosure.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A touch sensing device that compensates for a phase error of an active pen, the touch sensing device comprising:
a differential amplifier configured to amplify a difference between a first accumulated capacitance value, which is obtained from a first touch electrode group, and a second accumulated capacitance value, which is obtained from a second touch electrode group, based on a first downlink signal generated by the active pen during a pre-driving section;
an analog-to-digital converter (ADC) configured to convert an output signal of the differential amplifier into digital data; and
a phase error compensator configured to detect an edge of the first downlink signal based on a difference value between current and previous values of the digital data output from the ADC and compensate for a phase error of the first downlink signal by comparing the edge of the first downlink signal with an edge of an internal timing signal and adjusting the internal timing signal according to the phase error of the first downlink signal.

2. The touch sensing device of claim 1, wherein the phase error compensator calculates an absolute value of the difference value and detects a time point corresponding to a maximum absolute value among a plurality of absolute values calculated during a half-phase section of the internal timing signal as the edge of the first downlink signal in the half-phase section.

3. The touch sensing device of claim 2, wherein the phase error compensator selects absolute values greater than a predetermined threshold value from among the plurality of absolute values and detects a time point corresponding to a maximum absolute value among the selected absolute values for each corresponding half-phase section of the internal timing signal as the edge of the first downlink signal in the corresponding half-phase section.

4. The touch sensing device of claim 1, further comprising:
a plurality of integration circuits respectively connected to touch electrodes through touch lines during the pre-driving section to accumulate a capacitance, which is received from each of the touch electrodes, according to the first downlink signal, and respectively connected to the touch electrodes through the touch lines during an active driving section to accumulate a capacitance, which is received from each of the touch electrodes, according to a second downlink signal; and
a plurality of sample and hold circuits respectively connected to output terminals of the plurality of integration circuits during the active driving section to sample and hold an accumulated capacitance value of the second downlink signal, the accumulated capacitance value of the second downlink signal being output from each of the integration circuits,
wherein the ADC converts the accumulated capacitance value of the second downlink signal, which is output from each of the plurality of sample and hold circuits during the active driving section, into digital data to generate touch raw data.

5. The touch sensing device of claim 4, further comprising a touch controller configured to calculate at least one of pen data and pen touch coordinates of the active pen based on the touch raw data and the internal timing signal whose phase error is compensated.

6. The touch sensing device of claim 5, wherein, when the phase error of the first downlink signal having a half phase or more is occurred and a phase difference between the internal timing signal, whose phase error is compensated, and the first downlink signal is a half phase, the touch controller inverts a phase of the touch raw data, and the phase error compensator generates the pen data and the pen touch coordinates based on the inverted touch raw data.

7. The touch sensing device of claim 4, further comprising:
a first switching unit configured to connect, among the plurality of integration circuits, first integration circuits, which are respectively connected to a plurality of touch electrodes included in the first touch electrode group, to a first input terminal of the differential amplifier and connect second integration circuits, which are respectively connected to a plurality of touch electrodes included in the second touch electrode group, to a second input terminal of the differential amplifier during the pre-driving section and connect each of the first and second integration circuits to a corresponding sample and hold circuit of the plurality of sample and hold circuits during the active driving section;
a second switching unit configured to connect an output terminal of the differential amplifier to the ADC during the pre-driving section and connect an output of each of the plurality of sample and hold circuits to the ADC during the active driving section; and
a control circuit configured to control switching operations of the first and second switching units.

8. The touch sensing device of claim 1, wherein
the differential amplifier and the ADC are provided as a plurality of differential amplifiers and a plurality of ADCs,
the plurality of differential amplifiers are respectively connected to the plurality of ADCs, and
the phase error compensator detects the edge of the first downlink signal based on a difference value between current and previous values of final digital data obtained by summing digital data output from each of the plurality of ADCs.

9. The touch sensing device of claim 8, wherein
first touch electrode groups connected to a first input terminal of each of the plurality of differential amplifiers share some touch electrodes, or
second touch electrode groups connected to a second input terminal of each of the plurality of differential amplifiers share some touch electrodes, and
some touch electrodes to be shared are determined as touch electrodes on which a touch is occurred in a previous frame.

10. The touch sensing device of claim 1, further comprising a touch driver configured to transmit an uplink signal including at least one of panel information of a display panel and a protocol version to the active pen,
wherein the first downlink signal is transmitted from the active pen in synchronization with the uplink signal.

11. A method of compensating for a phase error of an active pen, the method comprising:
amplifying a difference between a first accumulated capacitance value, which is obtained from a first touch electrode group, and a second accumulated capacitance value, which is obtained from a second touch electrode group, based on a first downlink signal received from the active pen during a pre-driving section;
converting the amplified difference into digital data according to a predetermined sampling period;
detecting an edge of the first downlink signal based on a difference value between current and previous values of the digital data;
detecting a phase error of the first downlink signal by comparing the edge of the first downlink signal with an edge of an internal timing signal; and
compensating for the phase error of the first downlink signal by adjusting the internal timing signal according to the phase error of the first downlink signal.

12. The method of claim 11, further comprising:
generating touch raw data based on a second downlink signal that is received during an active driving section after the pre-driving section ends; and
calculating at least one of pen data and pen touch coordinates of the active pen based on the touch raw data and the internal timing signal whose phase error is compensated for.

13. The method of claim 12, wherein, when the phase error of the first downlink signal having a half phase or more is occurred and a phase difference between the internal timing signal, whose phase error is compensated, and the first downlink signal is half phase, a phase of the touch raw data is inverted, and the pen data and the pen touch coordinates are generated based on the inverted touch raw data.

14. The method of claim 11, wherein, in the detecting of the edge of the first downlink signal, an absolute value of the difference value is calculated, and a time point corresponding to a maximum absolute value among a plurality of absolute values calculated during a corresponding half-phase section of the internal timing signal is detected as the edge of the first downlink signal in the corresponding half-phase section.

15. The method of claim 14, wherein
absolute values greater than a predetermined threshold value are selected from among the plurality of absolute values, and
a time point corresponding to a maximum absolute value among the selected absolute values for each half-phase section of the internal timing signal is detected as the edge of the first downlink signal in the corresponding half-phase section.

* * * * *